(12) United States Patent
Khan et al.

(10) Patent No.: US 9,146,826 B2
(45) Date of Patent: Sep. 29, 2015

(54) METHOD AND APPARATUS FOR SCALING NETWORK SIMULATION

(71) Applicant: Tellabs Operations, Inc., Naperville, IL (US)

(72) Inventors: Hammad A. Khan, Aurora, IL (US); Li Zou, Westmont, IL (US); John Chan, Naperville, IL (US)

(73) Assignee: Tellabs Operations, Inc., Naperville, IL (US)

( * ) Notice: Subject to any disclaimer, the term of this patent is extended or adjusted under 35 U.S.C. 154(b) by 253 days.

(21) Appl. No.: 13/796,803

(22) Filed: Mar. 12, 2013

(65) Prior Publication Data

US 2014/0281715 A1    Sep. 18, 2014

(51) Int. Cl.
| | |
|---|---|
| *G06F 11/00* | (2006.01) |
| *G06F 11/26* | (2006.01) |
| *H04L 12/26* | (2006.01) |
| *G06F 11/263* | (2006.01) |

(52) U.S. Cl.
CPC ............ *G06F 11/261* (2013.01); *G06F 11/263* (2013.01); *H04L 43/50* (2013.01)

(58) Field of Classification Search
CPC . G06F 11/261; G06F 11/3648; G06F 11/263; G06F 11/273; H04L 43/50

USPC ................................................ 714/43, 28, 37
See application file for complete search history.

(56) References Cited

U.S. PATENT DOCUMENTS

| | | | | |
|---|---|---|---|---|
| 7,693,084 | B2 * | 4/2010 | Herzog ......................... | 370/251 |
| 2008/0172575 | A1 * | 7/2008 | Dunagan ........................ | 714/27 |
| 2009/0089620 | A1 * | 4/2009 | Johnson et al. ................. | 714/37 |
| 2010/0146099 | A1 * | 6/2010 | Lin et al. ....................... | 709/224 |

* cited by examiner

*Primary Examiner* — Yolanda L Wilson
(74) *Attorney, Agent, or Firm* — Hamilton, Brook, Smith & Reynolds, P.C.

(57) ABSTRACT

Embodiments disclosed herein enable network simulation including a range of networking technologies to be scaled to include large numbers of devices under test (DUTs) even though computing resources, such as a total number of simulation hosts or IP addresses, may be limited. By enabling a network simulator to scale with limited computing resources, developers may be enabled to reduce the requirements for physical space, power, cost, and maintenance for network simulation. For example, developers may be able to determine capacity, such as a total number of DUTs that a network management system (NMS) is capable of managing, even though few simulation hosts or IP addresses may be available for simulation of the DUTs.

20 Claims, 6 Drawing Sheets

METHOD AND APPARATUS FOR SCALING NETWORK SIMULATION

BACKGROUND OF THE INVENTION

A typical network simulator may include a range of networking technologies and may enable a developer to build and test complex networks using basic building blocks, such as a variety of nodes and links. A hierarchical network may be simulated using various types of nodes, such computers, hubs, bridges, routers, switches, links, mobile units, etc. Various types of Wide Area Network (WAN) technologies, such as Transmission Control Protocol (TCP), Asynchronous Transfer Mode (ATM), Internet Protocol (IP), as well as Local Area Network (LAN) technologies, such as Ethernet, token rings etc., can all be simulated with a typical simulator, enabling developers to test and analyze results in a controlled and reproducible environment. Network simulators enable developers to test scenarios that might be particularly difficult or expensive to emulate using real hardware. Compared to the cost and time involved in setting up an entire test bed to mirror a deployed network or portion of a deployed network, network simulators are relatively fast and inexpensive.

Similar to a deployed network, a network simulator may include a network management system (NMS) to manage network elements (e.g., managed devices). NMS device management may include configuration, accounting, performance, and fault monitoring. Similar to an NMS in a deployed network, the NMS of a network simulator may discover network inventory, monitor device health and status, provide alerts to conditions that impact system performance, and identify problems. Similar to an NMS in a deployed network, an NMS of the network simulator may employ various protocols to accomplish its variety of management tasks. For example, the NMS may use Simple Network Management Protocol (SNMP) for configuring and gathering information from devices in the network hierarchy.

SUMMARY OF THE INVENTION

Embodiments of the present invention provide a method, apparatus, computer program product, and corresponding system for testing a network device. According to one embodiment, a method for testing a network device may comprise communicating with a network node via a network interface. The network node may be configured to communicate with a plurality of network devices having unique virtual network addresses at a given physical port. The method may further comprise translating the unique virtual network addresses at the given physical port to a physical network address at unique multiple virtual ports. The method may still further comprise communicating with a device under test via a device interface at the physical network address and an associated one of the unique multiple virtual ports based on the translation.

Another example embodiment disclosed herein includes an apparatus corresponding to operations consistent with the method embodiments described above.

Further, yet another example embodiment may include a non-transitory computer-readable medium having stored thereon a sequence of instructions which, when loaded and executed by a processor, causes the processor to complete methods disclosed herein.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

In order to simulate and test a large number of devices under test (also referred to herein as DUTs, network elements, network devices, or managed devices), traditional network simulators may utilize a large number of physical network hosts (also referred to herein as simulation hosts) or a single simulation host that may be equipped with a large number of network interfaces. A total number of DUTs that a developer can include in a network simulator may be limited by the number of simulation hosts, the number of network interfaces of the simulation host(s), or the number of Internet Protocol (IP) addresses available for use by the developer.

Embodiments disclosed herein enable a developer to include a large number of DUTs, such as greater than 5,000 DUTs, in a network simulator even though computing resources, such as a total number of simulation hosts or IP addresses, may be limited. Embodiments disclosed herein eliminate the need to have a large number of physical network hosts, or a large number of physical network interfaces on a single simulation host. Embodiments disclosed herein enable developers to test with a large number of DUTs while reducing the network simulator's requirements for physical space, power, cost, and maintenance.

Network simulators may serve a variety of developer test purposes. For example, a developer may have a need for a network simulator in order to test capacity of a variety of NMSs, such as a given set of various NMS architectural implementations. The developer may be interested in NMS capacity, and may need to utilize a network simulator to determine a total number of network devices that may be managed for each of the various NMS architectural implementations in the given set. However, the developer may have a limited number of physical network hosts (e.g., simulation hosts) or a limited number of IP addresses available for assigning to the DUTs being managed by the network simulator. Instead of translation IP addresses to other IP addresses, embodiments disclosed herein may include translation of IP addresses at a same port to fewer IP addresses at multiple unique ports, enabling increased scaling of DUTs even though the developer may have limited IP addresses available. Embodiments disclosed herein may enable the developer to test capacity of each of the various NMS architectural implementations by enabling increased scaling of DUTs to be managed by the various NMS architectural implementation even though only limited computing resources may be available. The developer may be enabled to determine the number of DUTs that may be managed by the various NMS architectural implementations, enabling the developer to select a best NMS architectural implementation for field deployment.

Figure 1:
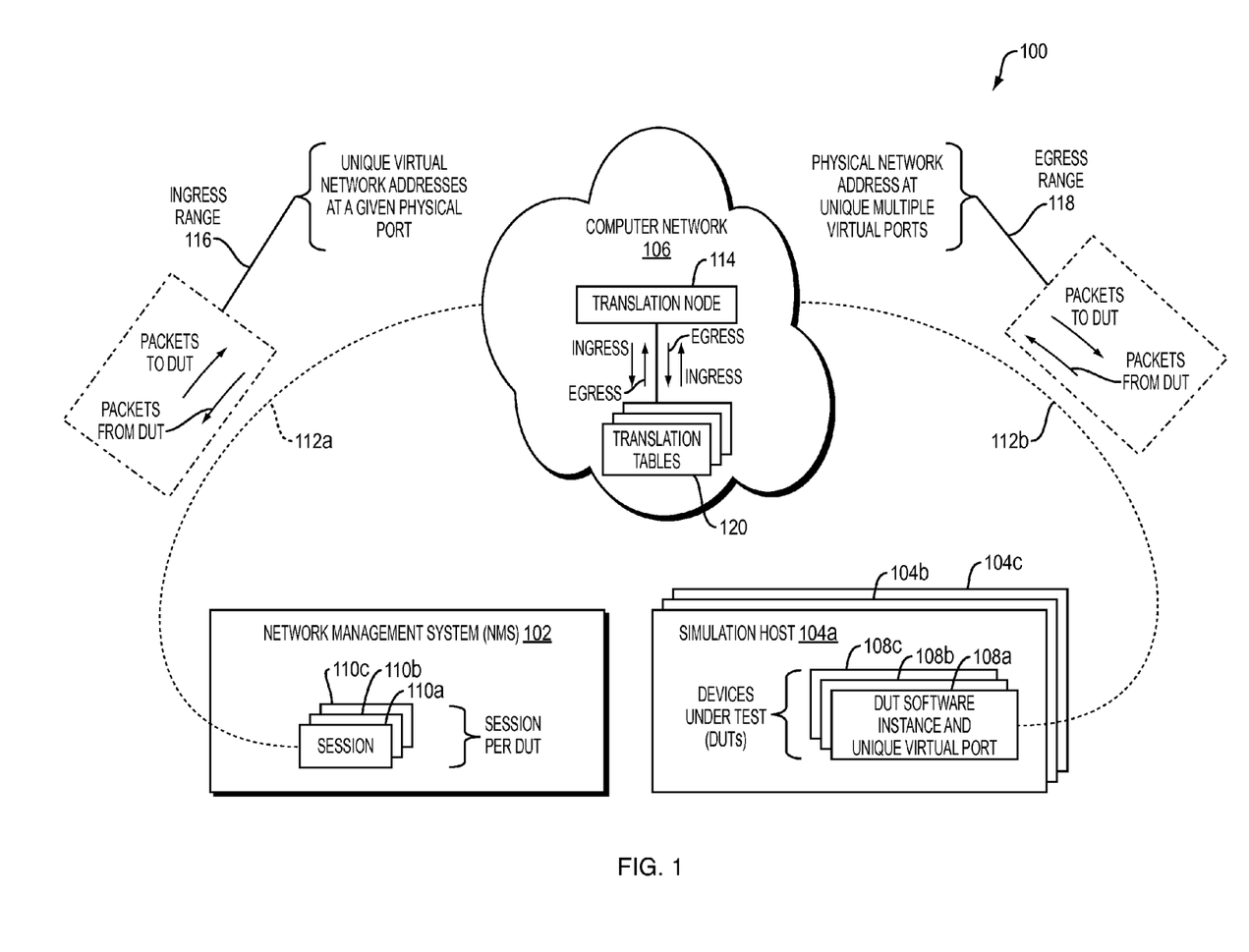
FIG. 1 is a block diagram of an embodiment of a network simulator.

FIG. 1 is a block diagram of an embodiment of a network simulator 100. The network simulator 100 may include an NMS 102 and one or more simulation hosts 104a-c. The NMS 102 and the one or more simulation hosts 104a-c may be communicatively operative via a computer network 106. The computer network 106 may be a wide-area network (WAN), such as the Internet, a wireless network, a local-area network (LAN), a cellular network, or another suitable type of network or combination thereof. The NMS 102 may be configured to manage one or more network elements, such as one or more DUTs 108a-c that may be included in the one or more simulation hosts 104a-c. The one or more DUTs may be associated with one or more sessions 110a-c running on the NMS 102 that is configured to manage the DUTs 108a-c. Each of the sessions 110a-c may correspond to a respective one of the DUTs 108a-c.

Each of the DUTs 108a-c may represent a network device being managed by the NMS 102. The one or more simulation hosts 104a-c may each have one or more network interfaces, such as physical ports (not shown), for receiving and transmitting packets, such as Internet Protocol (IP) packets, or any other suitable type of packets, being communicated between the NMS 102 and the simulation hosts 104a-c. Packets being communicated between the NMS 102 and the one or more simulation hosts 104a-c may be communicated using any suitable protocol, such as SNMP over TCP or UDP, TCP or UDP over IPv4 or IPv6, etc. An intermediary, such as a translation node 114 (also referred to herein as an apparatus), may translate network address and port information included in headers of packets being communicated between the NMS 102 and the one or more simulation hosts 104a-c.

The presence of the translation node 114 may be transparent (e.g., unknown) to the NMS 102 and the simulation hosts 104a-c. For example, the NMS 102 and the simulation hosts 104a-c may be configured to communicate directly with one another. The translation node 114 may be implemented in software, hardware, or any combination thereof. According to one embodiment, the translation node 114 may be implemented as a software router, such as a computer configured as a Linux® host. The translation node 114 may be configured to perform network address translation between an ingress range 116 utilized by the NMS 102 and an egress range 118 utilized by the one or more simulation hosts 104a-c. The translation node 114 may utilize one or more translation tables 120 for mapping the ingress range 116 including unique virtual network addresses at a given physical port to an egress range 118 including a physical network address at unique multiple virtual ports. The physical network address may include multiple unique physical network addresses fewer in number than the plurality of DUTs. The physical network address may be an IP address assigned to a physical interface (not shown) or the simulation host 108a that represents the plurality of DUTs 108a-c being managed by the NMS 102.

The ingress range 116 may include unique virtual network addresses at a given physical port. The unique virtual addresses may be unique virtual IP addresses. A host (not shown) in cloud (not shown) may be communicatively operative to the NMS 102 via the computer network 106 and may create the unique virtual IP addresses. Virtual IP addresses (VIPs or VIPAs) allow multiple IP addresses to be used on a single physical network interface. A VIP is an IP address assigned to multiple applications residing on a single server, multiple domain names, or multiple servers, rather than being assigned to a specific single server or network interface card (NIC). Incoming data packets are sent to the VIP address which are routed to actual network interfaces.

The NMS 102 may be configured to route traffic to/from the sessions 110a-c based on an ingress range that includes unique virtual address at a given physical port, such as the network interface (not shown) of the NMS 102. The unique virtual network addresses may be VIPs associated with each of the NMS 102's sessions 110a-c associated with the DUTs. However, at a simulation host, such as the simulation host 104a, the DUTs 108a-c may be associated with unique virtual ports in the egress range 118, as described below. Thus, the translation node 114 enables communication between the NMS 102 and the one or more simulation hosts 104a-c by performing addresses and port translation between the ingress range 116 and the egress range 118.

The one or more simulation hosts 104a-c may each include at least one network interface (not shown), such as a physical port configured with a unique physical network address, for sending and receive traffic. A simulation host, such as the simulation host 104a, may be configured with a large number of multiple unique virtual ports that are software emulations of physical ports not present in hardware of the simulation host 104a. For example, 5,000 unique virtual ports may be configured on the simulation host 104a. The egress range 118 of the one or more simulation hosts 104a-c may include a physical network address of the at least one network interface of the simulation host at the unique multiple virtual ports of the corresponding simulation host.

Each of the DUTs 108a-c may be represented by a software instance instantiated on the simulation host 104a. Each one of the DUTs 108a-c may be associated with one of the multiple unique virtual ports, enabling a large number of DUTs to be represented by a single simulation host that may include only one physical port. Each software instance of a DUT that may be instantiated on the simulation host 104a may correspond to an associated one of the multiple unique virtual ports on the simulation host and may further have a unique session with the NMS 102.

A simulation host, such as the simulation host 104a, may be configured to route traffic to/from the DUT software instances 108a-c based on the egress range 118 that includes the multiple unique virtual ports at a given physical port, such as the network interface (not shown) of the simulation host 104a. The simulation host 104a may be configured to route packets received on the simulation host 104a's physical port to the DUT software instances 108a-c by associating the traffic to the unique virtual ports associated with a DUT software instances 108a-c based on header information included with the packets that specifies virtual ports.

The NMS 102 may be configured to communicate with the DUTs 108a-c via unique virtual network addresses at a given physical port included in the ingress range 116. The translation node 114 may be configured to translate the unique virtual network addresses at the given physical port (e.g., the ingress range 116) to a physical network address at unique multiple virtual ports (e.g., the egress range 118). The translation node 114 may enable communication between the NMS 102 and the DUTs 108a-c via a device interface (not shown) at the physical network address and an associated one of the unique multiple virtual ports in the egress range 118 based on the translation.

Figure 2:
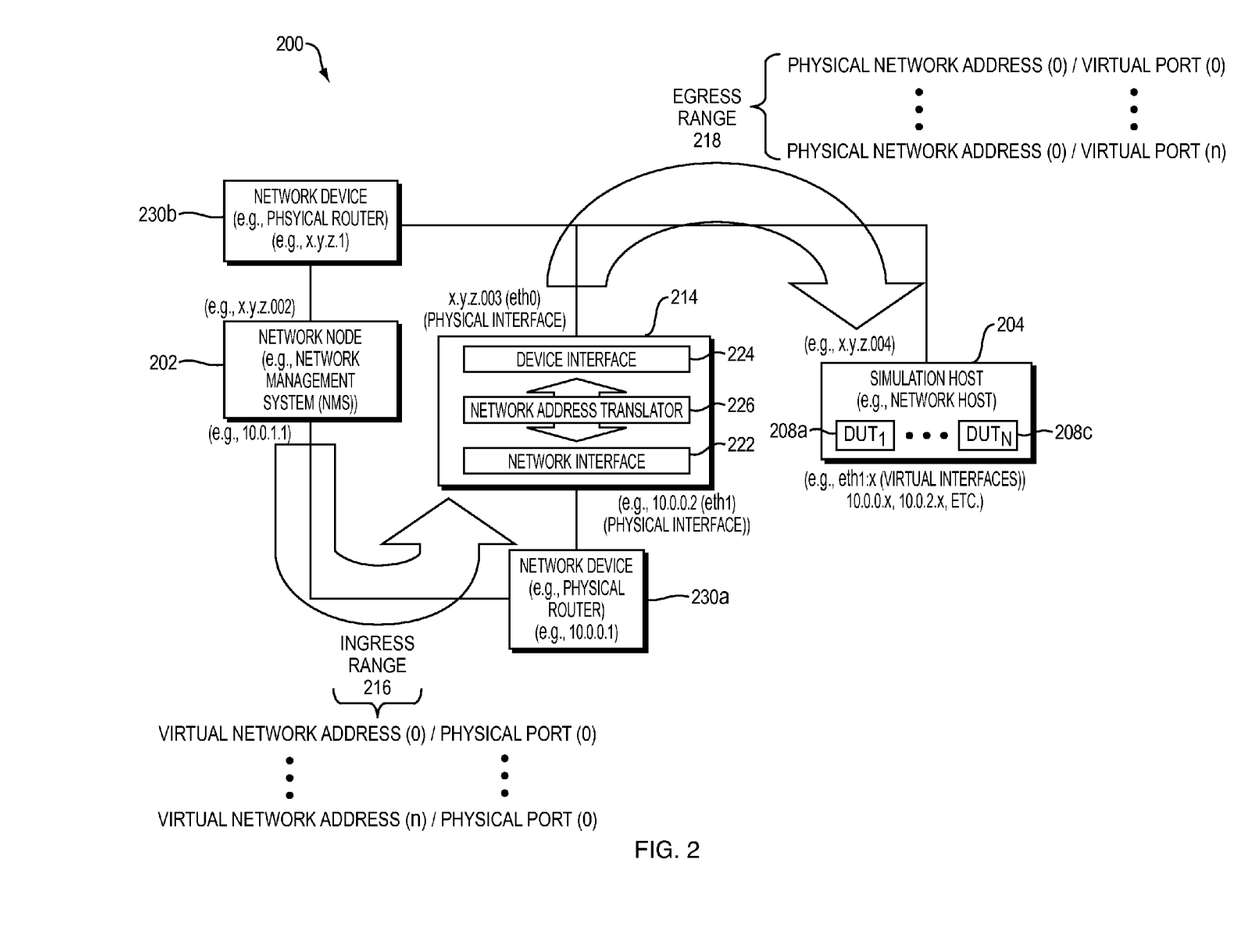
FIG. 2 is a block diagram of another embodiment of a network simulator.

FIG. 2 is a block diagram of another embodiment of a network simulator 200. One of ordinary skill in the art will appreciate that the network address and physical ports shown in the example embodiment of FIG. 2 are for example illustrative purposes only and that such network address and port information may be any suitable addresses or ports that a developer may desire based on the developer's specific implementation. The network simulator 200 may include a network node 202. The network node 202 may be an NMS. The network node 202 may be communicatively operative with one or more network devices 230a, such as a physical router or other suitable forwarding device. The network node 202 may be communicatively operative with a translation node 214 via the network device 230a. The translation node 214 may communicate with the network node 202 via a network interface 222. The network node 202 may be configured to communicate with a plurality of network devices having unique virtual network addresses at a given physical port, such as an ingress range 216. The plurality of network devices may be DUTs 208a-c that may be represented by software instances on a simulation hosts 204. The DUT software instances 208a-c may each have a unique session (not shown) with the network node 202.

The network device 230a may forward traffic in the ingress range 216 between the network node 202 and the translation node 214. The translation node 214 may be configured to translate the unique virtual network addresses at the given physical port (e.g., ingress range 216) to a physical network address at unique multiple virtual ports (e.g., egress range 218). The translation node 214 may include a device interface 224. The network node 202 may communicate with a device under test, such as DUTs 208a-c, via the device interface 224 of the translation node 214 at the physical network address and an associated one of the unique multiple virtual ports (e.g., egress range 218) based on the translation.

The translation node 214 may be implemented as a software router and may include a network address translator 226 that utilizes one or more translation tables (not shown) for mapping the ingress range 216 to the egress range 218 and vice versus. The network address translator 226 may be configured to translate unique virtual network addresses at the given physical port that the network node 202 associates with the DUTs 208a-c to a physical network address, such as the physical network address assigned to a physical port (e.g., network interface) (not shown) of the simulation host 204, at unique multiple virtual ports that the simulation host 204 associates with the DUT software instances 208a-c.

If the simulation host 204 has multiple physical ports the simulation host 204 may have more than one network address assigned, or multiple simulation hosts may be utilized. The unique virtual network addresses and the physical network addresses referred to herein may be IP addresses. The network node 202 may communicate with the DUTs 208a-c via IP packets. Packets (not shown) being communicated in the network simulator 200 may contain multiple layers of information. For example, an open systems interconnection (OSI) reference model of a packet includes a physical layer (L1), data link layer (L2), network layer (L3), transport layer (L4), session layer (L5), presentation layer (L6), and application layer (L7). The translation node 214 may translate packet information in the Layer 3 of the IP packet, specifically the source or destination IP address.

Each layer of the OSI reference model can communicate with the layer directly above or directly below itself. The physical layer (L1) defines electrical or physical relationships between network elements and a medium for transmitting traffic. The data link layer (L2) transfers data between network elements using functions and procedures at that layer. The network layer (L3) performs network routing functions and possible quality of service optimization requested at other network elements or packet layers. The transport layer (L4) enables end-user traffic transfer; typical examples include TCP or UDP. The session layer (L5) manages local and remote application connections in a network. The presentation layer (L6) provides correspondence between application layer entities that may have different semantics. The application layer (L7) interacts with a software application that an end-user employs via a user interface of the software application.

Embodiments disclosed herein may enable the network node 202 to manage a large number of DUTs 208a-c, such as 5000 DUTs, even though computing resources, such as the number of IP addresses or the number of simulation hosts available may be limited. According to one embodiment, the translation node 214 may be a Linux® host and the translation tables (not shown) may be Linux® IP tables. Neither the network node 202 nor the simulation host 204 needs to be aware of the presence of the translation node 214. Embodiments disclosed herein enable a network node 202 to be utilized in a configuration that may be deployed to the field. For example, because the translation node 214 may present unique IP addresses for the DUTs 208a-c, according to embodiments disclosed herein, a developer need not incorporate any special software flags or special settings in the implementation of the NMS sessions that manage the DUTs 208a-c. For example, embodiments disclosed herein may obviate a need for special simulation port(s) or simulation mode(s) for the NMS 202 implementation. According to embodiments disclosed herein, a host (not shown) in cloud (not shown) may create virtual IP addresses for the DUTs 208a-c that may be utilized by the network node 202 for association with the DUTs 208a-c, even though the DUTs 208a-c are associated with unique virtual ports at the simulation host 204.

Figure 3:
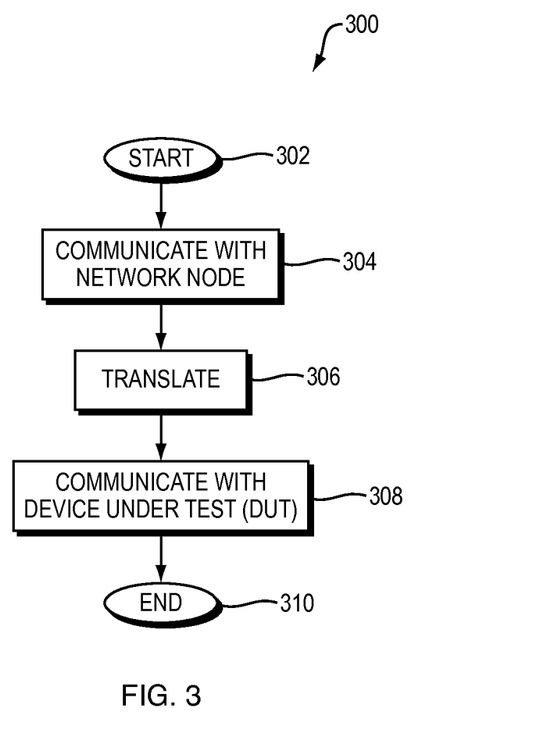
FIG. 3 is an example flow diagram of an embodiment of a method for testing a network device.

FIG. 3 is an example flow diagram 300 of an embodiment of a method for testing a network device. The method may start (302) and communicate with a network node via a network interface. The network node may be configured to communicate with a plurality of network devices having unique virtual network addresses at a given physical port (304). The method may further translate the unique virtual network addresses at the given physical port to a physical network address at unique multiple virtual ports (306). The method may still further communicate with a device under test via a device interface at the physical network address and an associated one of the unique multiple virtual ports based on the translation (308) and the method thereafter ends (310) in the example embodiment.

The unique virtual network addresses and the physical network address may be Internet Protocol (IP) addresses, and the method may further include assigning the physical network address to an apparatus associated with the device under test.

The method may include representing one of the plurality of network devices by the device under test and may include representing the device under test by a software instance corresponding to the associated one of the multiple virtual ports.

The method may include communicating with the plurality of network devices via IP packets.

According to one embodiment, translating may be based on a mapping table.

The method may include creating a script configured to accept input parameters and to generate a series of one or more commands based on the input parameters. The method may further include loading and executing the script by a processor and may still further include causing the processor to generate the mapping table. The mapping table may include a mapping between the unique virtual network addresses and the unique multiple virtual ports based on the one or more commands generated.

The network node may be a network management system (NMS), and the method may further include representing at least one of the plurality of network devices by the device under test. The method may still further include representing the device under test by a software instance. The software instance may correspond to the associated one of the multiple virtual ports and may have a unique session with the NMS.

According to one embodiment, the physical network address may include multiple unique physical network addresses fewer in number than the plurality of network devices.

Each of the multiple physical network addresses may correspond to a simulation host of a plurality of simulation hosts. The method may further include, at the simulation host, instantiating a set of one or more software instances and mapping each software instance of the set of one or more software instances to a unique one of the unique multiple virtual ports.

Embodiments disclosed herein may configure a network simulator in a unique way enabling increased scalability. According to embodiments disclosed herein, a simulation host, such as the simulation hosts 104a-c and 204 of FIGS. 1 and 2, may be configured to listen on specific IP addresses (such as the physical network addresses assigned to the simulation hosts) and port (such as virtual ports assigned to the DUTs of the simulation hosts) and communicate with a network node, such as the NMSs 102 and 202 of FIGS. 1 and 2, even though the NMSs are configured to listen on specific ports and virtual network addresses. According to embodiments disclosed herein, commands may be generated via script configuration enabling generation of the network address translation tables utilized by the translation nodes 114 and 214 via execution of the commands in order to generate commands that enable generation of the network address translation disclosed herein.

Figure 4A:
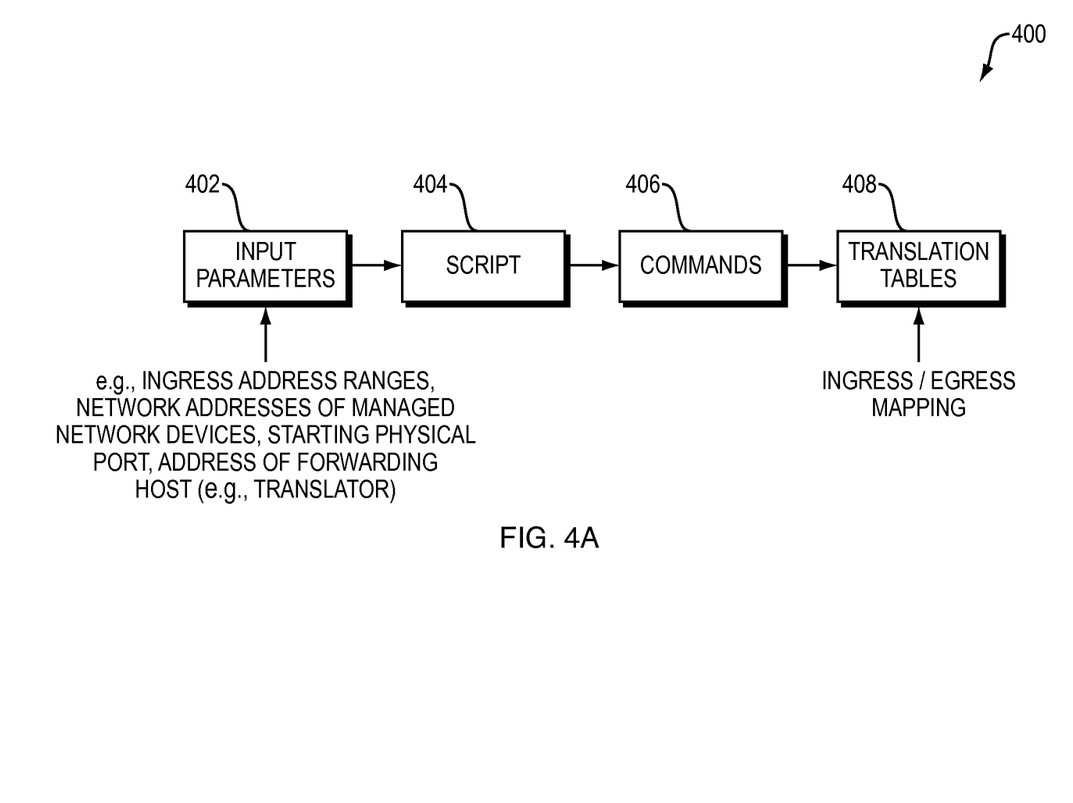
FIG. 4A is a block diagram of an example flow for generating network address translation tables according to embodiments disclosed herein.

FIG. 4A is a block diagram 400 of an example flow for generating network address translation tables according to embodiments disclosed herein (400). Input parameters 402, such as ingress address ranges, addresses of managed network devices, a starting physical port, an address of a forwarding host (e.g., network address translator), may be input to a script 404 that has been created. The script 404 may be configured to accept the input parameters 402 and to generate a series of one or more commands 406 based on the input parameters 402. The script 404 may be loaded and executed by a processor (not shown) causing the processor to generate the mapping (e.g., translation) table 408. The mapping table 408 may include a mapping between unique virtual network addresses and unique multiple virtual ports based on the one or more commands 406 generated.

According to embodiments disclosed herein, a developer may scale a network simulator even though computing resources may be limited. Embodiments disclosed herein may configure tools, such as Linux® tools may be known to one of ordinary skill in the art, in a unique way. One of ordinary skill in the art will appreciate that Linux® tools may be used for example purposes and that any suitable tools, Operating Systems (Oss) etc. may be utilized.

Turning back to FIG. 2, example IP address configuration is shown for simulating multiple network hosts with a single host 204 according to embodiments disclosed herein. FIG. 2 illustrates an embodiment of a configuration of a network simulator 200 configured to simulate, for example, 507 network hosts with physical IP addresses in ranges from 10.0.0.2 to 10.0.0.254 and from 10.0.2.1 to 10.0.2.254. A single network host 204 may be configured with a physical address x.y.z.004 to accept all the requests originally designated for the 507 network hosts. However, instead of two ranges of IP addresses, configuration of the single physical network host 204 may be in ranges of pre-determined ports.

In the example embodiment, each class C subnet may be configured against a physical interface, such as the eth1 interface of the translation node 214's network interface 222. A file may be created (e.g., with a name of ifcfg-eth1-rangen located in the /etc/sysconfig/network-scripts folder of the translation node 214, where n identifies the particular range) that includes defined start and end IP addresses. For example, two configuration files ifcfg-eth1-range0 and ifcfg-eth1-range1 may be created corresponding to the two example IP Address ranges (e.g., 10.0.0.2-10.0.0.254 and 10.0.2.1-10.0.2.254) using eth1.

The first file may be named ifcfg-eth1-range0, including a defined IP address start address, such as IPADDR_START=10.0.0.2, a defined IP address end address, such as IPADDR_END=10.0.0.254, and a number for assignment to a first IP alias, such as CLONENUM_START=0. The IPADDR_START is the first IP from the address range to bind to a physical interface, and IPADDR_END is the last IP from that address range. The CLONENUM_START is the number that will be assigned to the first IP alias interface. For example, for a physical interface eth1 and a CLONENUM_START=0, the configuration file will create 252 interfaces starting with eth1:0 (eth1:0, eth1:1, eth1:2 etc) and ending with eth1:252.

A second configuration file, such as ifcfg-eth1-range1, may be configured in a similar manner, with a defined IP start address of IPADDR_START=10.0.2.1 and an IP end address of IPADDR_END=10.0.2.254 and a CLONENUM_START=253. Once the above range configuration files are in place, a command may be issued on the translation node 214, such as "service network restart," to enable the configuration to be activated. The "service network restart" command will cause all network interfaces to be shutdown and restarted so that the address range may be activated. Upon completion of the command, new virtual IP Address ranges may be created and verified. The "ifconfig—a" command may be run for verification. Given the virtual IP addresses, IP forwarding on the translation node 214, such as software router implemented using a Linux®, may be configured as follows. To configure forwarding for the entire network, a script file, such as setup_forwarding.sh.

Figure 4B:
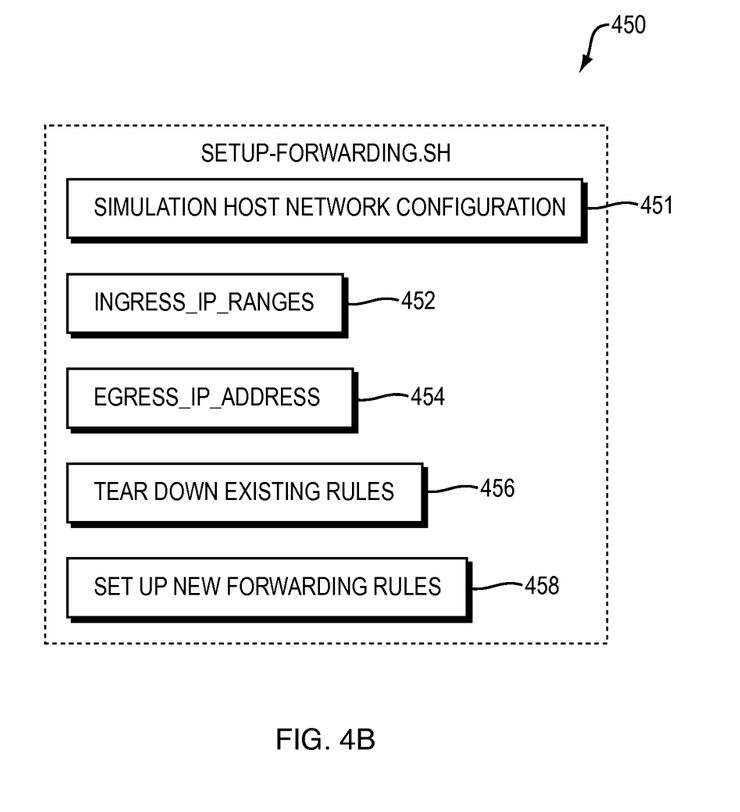
FIG. 4B is a block diagram of example components of a script file.

FIG. 4B is a block diagram of example components of a script file 450, such as a Linux® setup_forwarding.sh. In the example script file 450, a component of the script may define INGRESS_IP_RANGES 452 and simulation host network configuration 451. The INGRESS_IP_RANGES 452 may be specified in 4-tuples, for example, as ingress_ip_first, ingress_ip_last, redirect_to_ip, and redirect_to_port_start. The simulation host network configuration may include a network address for the simulation host and virtual port information of the simulation host's DUTs. For the example network simulator configuration of FIG. 4B, the INGRESS_IP_RANGES 452 may include "10.0.0.2" "10.0.0.254" "10.0.2.2" "10.0.2.254", and simulation host network configuration 451 may include the network address x.y.z.004 of the simulation host and a virtual port number of the first DUT 208a. Each pair, for example "10.0.0.2" "10.0.0.254" and "10.0.2.2" "10.0.2.254" may represent an IP Address range to be forwarded to the physical network host (e.g., "x.y.z.004").

The script 450 may include an EGRESS_IP_ADDRESS definition 454. For FIG. 2, the EGRESS_IP_ADDRESS may be defined as "x.y.z.003." The script 450 may contain code (not shown) for generating forwarding rules. The script may tear down existing rules 456 and then setup new forwarding rules 458. For example, an IP Address of the translation node 214 (e.g., forwarding software router) may be reachable from the simulation host 204 based on forwarding rules that are setup by the configuration script 450. The script changes may be saved, and the script may be run as root to configure the translation node 214 for forwarding according to embodiments disclosed herein.

Figure 5:
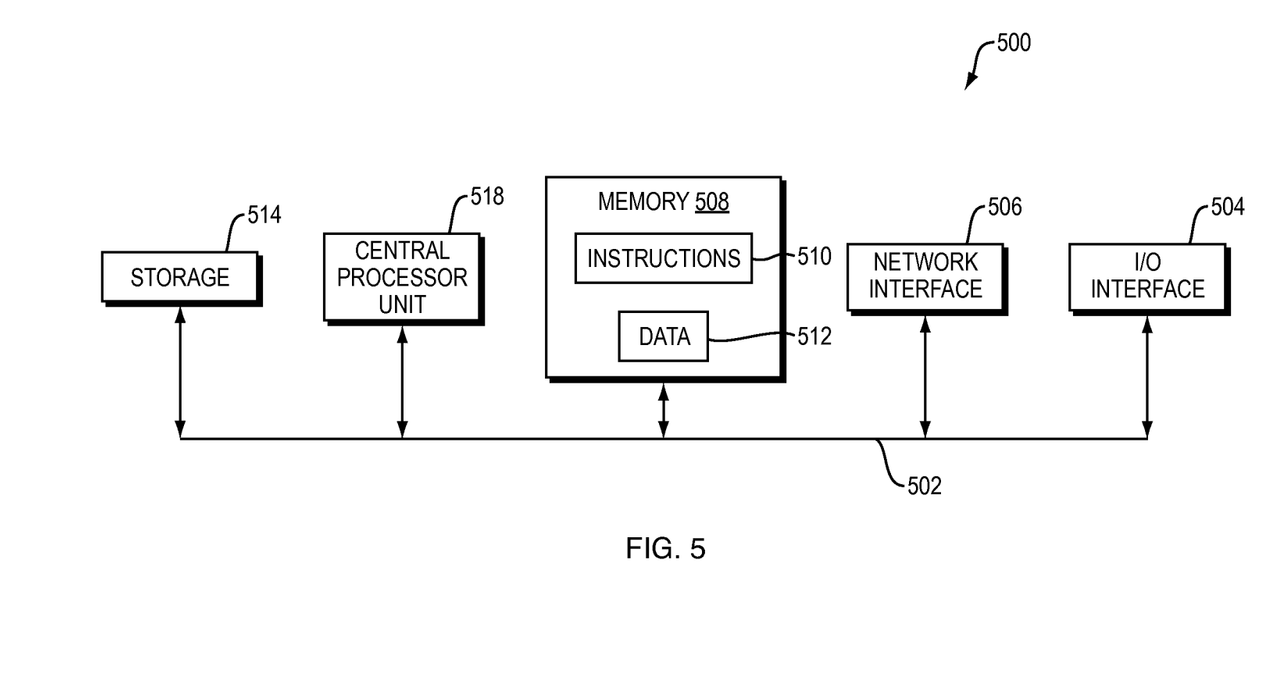
FIG. 5 is a block diagram of an example internal structure of a computer optionally within an embodiment disclosed herein.

FIG. 5 is a block diagram of an example of the internal structure of a computer 500 in which various embodiments of the present invention may be implemented. The computer 500 contains a system bus 502, where a bus is a set of hardware lines used for data transfer among the components of a computer or processing system. The system bus 502 is essentially a shared conduit that connects different elements of a computer system (e.g., processor, disk storage, memory, input/output ports, network ports, etc.) that enables the transfer of information between the elements. Operative with the system bus 502 is an I/O device interface 504 for connecting various input and output devices (e.g., keyboard, mouse, displays, printers, speakers, etc.) to the computer 500. A network interface 506 allows the computer 500 to connect to various other devices attached to a network. Memory 508 provides volatile storage for computer software instructions 510 and data 512 that may be used to implement embodiments of the present invention. Disk storage 514 provides non-volatile storage for computer software instructions 510 and data 512 that may be used to implement embodiments of the present invention. A central processor unit 518 is also operative with the system bus 502 and provides for the execution of computer instructions.

Further example embodiments of the present invention may be configured using a computer program product; for example, controls may be programmed in software for implementing example embodiments of the present invention. Further example embodiments of the present invention may include a non-transitory computer-readable medium containing instructions that may be executed by a processor, and, when executed, cause the processor to complete methods described herein. It should be understood that elements of the block and flow diagrams described herein may be implemented in software, hardware, firmware, or other similar implementation determined in the future. In addition, the elements of the block and flow diagrams described herein may be combined or divided in any manner in software, hardware, or firmware.

If implemented in software, the software may be written in any language that can support the example embodiments disclosed herein. The software may be stored in any form of computer readable medium, such as random access memory (RAM), read only memory (ROM), compact disk read-only memory (CD-ROM), and so forth. In operation, a general purpose or application-specific processor loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments of the invention.

While this invention has been particularly shown and described with references to example embodiments thereof, it will be understood by those skilled in the art that various changes in form and details may be made therein without departing from the scope of the invention encompassed by the appended claims.

What is claimed is:

1. An apparatus for translating network addresses in a network simulator, the apparatus comprising:
   a network interface configured to communicate with a network node, the network node configured to communicate with a plurality of network devices having unique virtual network addresses at a given physical port;
   a network address translator configured to translate the unique virtual network addresses at the given physical port to a physical network address at unique multiple virtual ports; and
   a device interface configured to communicate with a network device of the plurality of network devices at the physical network address and an associated one of the unique multiple virtual ports based on the translation.

2. The apparatus of claim 1 wherein the unique virtual network addresses and the physical network address are Internet Protocol (IP) addresses and further wherein the physical network address is an IP address assigned to an apparatus associated with the network device.

3. The apparatus of claim 1 wherein the network device is a device under test that is managed by the network node within the network simulator and represented by a software instance corresponding to the associated one of the multiple virtual ports.

4. The apparatus of claim 1 wherein the network node is further configured to communicate with the plurality of network devices via IP packets.

5. The apparatus of claim 1 wherein the network address translator is configured based on a mapping table.

6. The apparatus of claim 5, wherein the mapping table is generated via a script, and further wherein the script accepts input parameters and is configured to generate a series of one or more commands that, when loaded and executed by a processor, generates the mapping table including a mapping between the unique virtual network addresses and the unique multiple virtual ports.

7. The apparatus of claim 1 wherein the network node is a network management system (NMS).

8. The apparatus of claim 7 wherein the network device is a device under test that is managed by the NMS within the network simulator and represented by a software instance corresponding to the associated one of the multiple virtual ports and having a unique session with the NMS.

9. The apparatus of claim 1 wherein the physical network address includes multiple unique physical network addresses fewer in number than the plurality of network devices.

10. The apparatus of claim 9 wherein each of the multiple physical network addresses corresponds to a simulation host of a plurality of simulation hosts and further wherein the simulation host instantiates a set of one or more software instances, and further wherein each software instance of the set of one or more software instances is mapped to a unique one of the unique multiple virtual ports.

11. A method for translating network addresses in a network simulator, the method comprising:
    communicating with a network node via a network interface, the network node being configured to communicate with a plurality of network devices having unique virtual network addresses at a given physical port;
    translating the unique virtual network addresses at the given physical port to a physical network address at unique multiple virtual ports; and communicating with a network device of the plurality of network devices via a device interface at the physical network address and an associated one of the unique multiple virtual ports based on the translation.

12. The method of claim 11 wherein the unique virtual network addresses and the physical network address are Internet Protocol (IP) addresses, and wherein the method further includes assigning the physical network address to an apparatus associated with the network device.

13. The method of claim 11 wherein the network device is a device under test that is managed by the network node within the network simulator, the method of claim 11 further including representing the device under test by a software instance corresponding to the associated one of the multiple virtual ports.

14. The method of claim 11 further including communicating with the plurality of network devices via IP packets.

15. The method of claim 11 wherein the translating is based on a mapping table.

16. The method of claim 15, further including creating a script configured to accept input parameters and to generate a series of one or more commands based on the input parameters, and further including loading and executing the script by a processor and still further including causing the processor to generate the mapping table including a mapping between the unique virtual network addresses and the unique multiple virtual ports based on the one or more commands generated.

17. The method of claim 16 wherein the network node is a network management system (NMS) and the network device is a device under test that is managed by the NMS within the network simulator, the method of claim 16 further including representing the device under test by a software instance corresponding to the associated one of the multiple virtual ports and having a unique session with the NMS.

18. The method of claim 11 wherein the physical network address includes multiple unique physical network addresses fewer in number than the plurality of network devices.

19. The method of claim 18 wherein each of the multiple physical network addresses corresponds to a simulation host of a plurality of simulation hosts, and further including, at the simulation host, instantiating a set of one or more software instances and mapping each software instance of the set of one or more software instances to a unique one of the unique multiple virtual ports.

20. A non-transitory computer-readable medium for translating network addresses in a network simulator, the non-transitory computer-readable medium having stored thereon a sequence of instructions which, when loaded and executed by a processor, causes the processor to: communicate with a network node via a network interface, the network node being configured to communicate with a plurality of network devices having unique virtual network addresses at a given physical port; translate the unique virtual network addresses at the given physical port to a physical network address at unique multiple virtual ports; and communicate with a network device of the plurality of network devices via a device interface at the physical network address and an associated one of the unique multiple virtual ports based on the translation.

* * * * *